(12) United States Patent
Muff et al.

(10) Patent No.: US 8,356,160 B2
(45) Date of Patent: Jan. 15, 2013

(54) PIPELINED MULTIPLE OPERAND MINIMUM AND MAXIMUM FUNCTION

(75) Inventors: Adam J. Muff, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 12/014,183

(22) Filed: Jan. 15, 2008

(65) Prior Publication Data

US 2009/0182990 A1 Jul. 16, 2009

(51) Int. Cl.
*G06F 15/76* (2006.01)
(52) U.S. Cl. .......................................................... 712/7
(58) Field of Classification Search .................... None
See application file for complete search history.

(56) References Cited

U.S. PATENT DOCUMENTS

| | | | | |
|---|---|---|---|---|
| 5,721,809 A | * | 2/1998 | Park | 706/4 |
| 7,072,922 B2 | * | 7/2006 | Andreev et al. | 708/207 |
| 7,434,034 B2 | * | 10/2008 | Selvaggi et al. | 712/221 |
| 2003/0188143 A1 | * | 10/2003 | Sheaffer | 712/236 |
| 2006/0227966 A1 | * | 10/2006 | Knowles | 380/42 |

* cited by examiner

*Primary Examiner* — Jacob A Petranek
(74) *Attorney, Agent, or Firm* — Patterson & Sheridan, LLP

(57) ABSTRACT

Embodiments of the invention provide methods and apparatus for executing a multiple operand minimum or maximum instructions. Executing the multiple operand minimum or maximum instruction comprises transferring more than two operands to one or more processing lanes of a vector unit. A first compare operation may be performed in at least one processing lane of the vector unit to determine a greater or smaller of a first operand and a second operand. The greater (or smaller) operand may be transferred to a dot product unit, wherein, in a second compare operation, the transferred operand is compared to at least a third operand to determine one of the greater and smaller of the more than two operands.

21 Claims, 7 Drawing Sheets

| CYCLE 1 | CYCLE 2 | CYCLE 3 | CYCLE 4 | CYCLE 5 | CYCLE 6 | CYCLE 7 | CYCLE 8 |
|---------|---------|---------|---------|---------|---------|---------|---------|
| X1 vs X2 |         |         |         |         |         |         |         |
|         | X1 vs X2 |         |         |         |         |         |         |
|         |         | X1 vs X2 |         |         |         |         |         |
|         |         |         | X1 vs X2 |         |         |         |         |
| stall   |         |         |         |         |         |         |         |
|         | stall   |         |         |         |         |         |         |
|         |         | stall   |         |         |         |         |         |
|         |         |         | stall   | vsX3    |         |         |         |
|         |         |         |         |         | vsX3    |         |         |
|         |         |         |         |         |         | vsX3    |         |
|         |         |         |         |         |         |         | vsX3    |

601 (rows 1–4), 602 (rows 5–11)

FIG. 6A

| CYCLE 1 | CYCLE 2 | CYCLE 3 | CYCLE 4 | CYCLE 5 | CYCLE 6 |
|---|---|---|---|---|---|
| X1 vs X2 vs X3 | | | | | |
| | X1 vs X2 vs X3 | | | | |
| | | X1 vs X2 vs X3 | | | |
| | | | X1 vs X2 vs X3 | | |
| | | | | X1 vs X2 vs X3 | |
| | | | | | X1 vs X2 vs X3 |

PIPELINED MULTIPLE OPERAND MINIMUM AND MAXIMUM FUNCTION

BACKGROUND OF THE INVENTION

1. Field of the Invention

The present invention generally relates to data processing, and more specifically to an instruction set for obtaining an arithmetic result of multiple operands.

2. Description of the Related Art

Computer software applications generally include a set of instructions for manipulating and processing data. Manipulating and processing data may involve performing one or more arithmetic operations on the data such as, for example, adding one or more numbers to obtain a sum of the numbers. Modern computer systems generally include scalar units, vector units, or shared vector/scalar units that are capable of performing operations on data. A scalar unit may perform scalar operations such as, for example, addition, subtraction, division, multiplication, and the like. A vector unit may perform vector operations such as, for example, dot product and cross product operations. Each of the scalar and vector units may receive one or more operands as an input. The scalar and vector units may process the operands to generate a desired result.

SUMMARY OF THE INVENTION

The present invention generally relates to data processing, and more specifically to an instruction set for obtaining an arithmetic result of multiple operands.

One embodiment of the invention provides a method for comparing more than two operands. The method generally comprises transferring more than two operands comprising at least a first operand, a second operand, and a third operand from a register file to one or more processing lanes of a vector unit in response to receiving a multiple operand instruction, and comparing the first operand to the second operand in a first processing lane of the vector unit. The method further comprises transferring one of the first operand and the second operand from the first processing lane to a dot product unit based on the comparison, and comparing one of the first operand and the second operand to the third operand in the dot product unit.

Another embodiment of the invention provides a method for determining one of a greater or smaller of three operands. The method generally comprises transferring a first operand and a second operand from a register file to a first processing lane of a vector unit, and a third operand from the register file to a second processing lane of the vector unit in response to receiving a three operand instruction, and comparing the first operand to the second operand in the first processing lane. The method further comprises transferring one of a greater and smaller of the first operand and the second operand from the first processing lane to a dot product unit, transferring the third operand from the second processing lane to the vector unit, and comparing the transferred one of the first operand and the second operand to the third operand in the dot product unit to determine one of a greater and smaller of the first operand, second operand, and third operand.

Yet another embodiment of the invention provides a system generally comprising a plurality of processors communicably coupled with one another. Each processor generally comprises a register file comprising a plurality of registers, each register comprising a plurality of operands and a vector unit comprising a plurality of vector processing lanes and configured to receive more than two operands, wherein at least one vector processing lane is configured to compare a first operand and a second operand to determine one of a greater and smaller of the first operand and second operand. The system further comprises a dot product unit configured to receive one of the first operand and the second operand from the at least one vector processing lane and compare the received one of the first operand and second operand to a third operand to determine one of a greater and smaller of the more than two operands.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 6A illustrates an exemplary timing diagram for comparing more than two operands according to an embodiment of the invention.

FIG. 6B illustrates another exemplary timing diagram for comparing more than two operands according to an embodiment of the invention.

DETAILED DESCRIPTION OF THE PREFERRED EMBODIMENTS

Embodiments of the invention provide methods and apparatus for executing a multiple operand minimum or maximum instruction. Executing the multiple operand minimum or maximum instruction comprises transferring more than two operands to one or more processing lanes of a vector unit. A first compare operation may be performed in at least one processing lane of the vector unit to determine a greater or smaller of a first operand and a second operand. The greater (or smaller) operand may be transferred to a dot product unit, wherein, in a second compare operation, the transferred operand is compared to at least a third operand to determine one of the greater and smaller of the more than two operands.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

Figure 1:
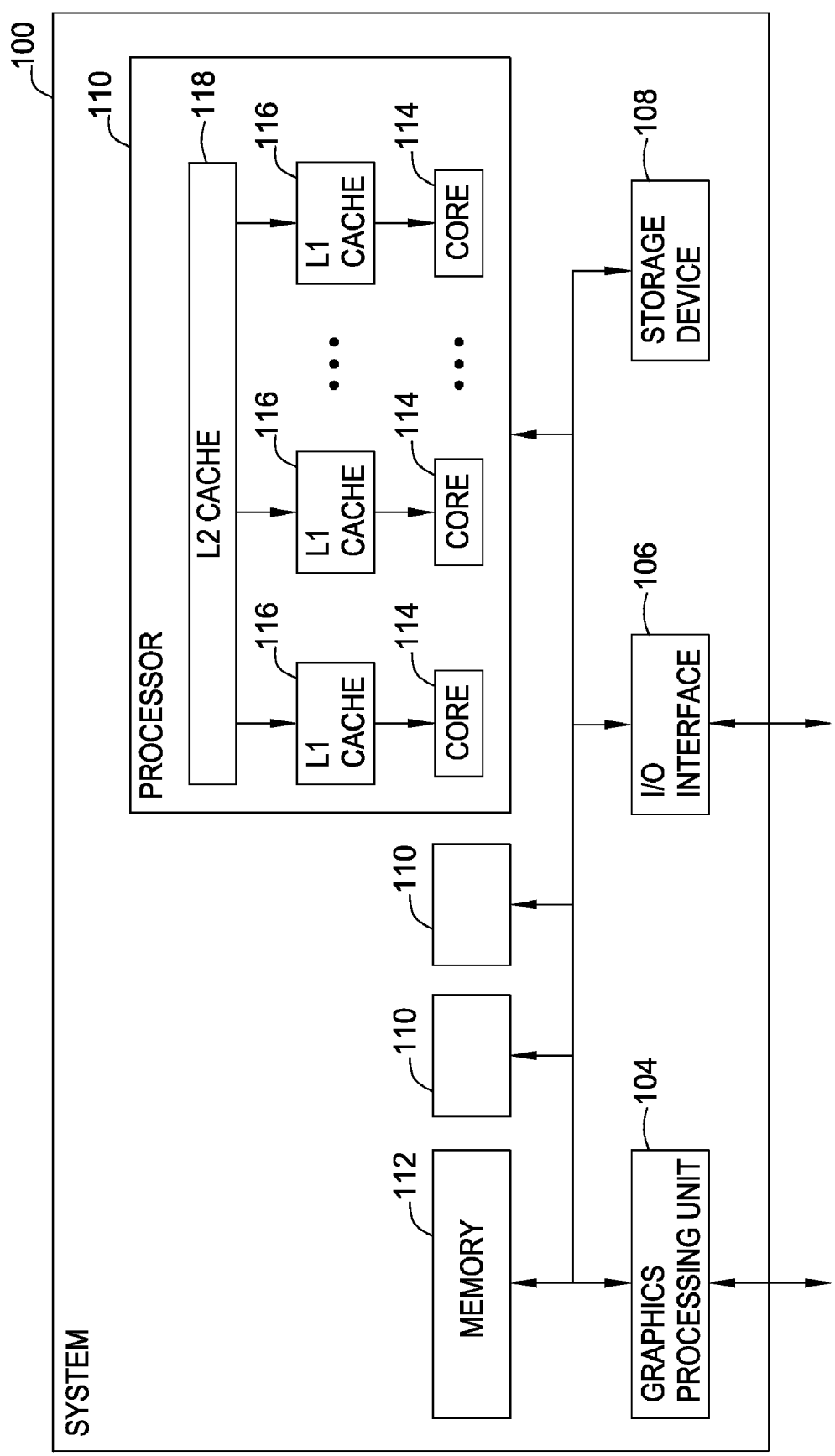
FIG. 1 illustrates an exemplary system according to an embodiment of the invention.

FIG. 1 illustrates an exemplary system 100 according to an embodiment of the invention. As illustrated, system 100 includes a plurality of processors 110, memory 112, graphics processing unit (GPU) 104, input/output (10) interface 106, and a storage device 108. The memory 112 is preferably a random access memory sufficiently large to hold the necessary programming and data structures operated on by processor 110. While memory 112 is shown as a single entity, it should be understood that memory 112 may in fact comprise a plurality of modules, and that memory 112 may exist at multiple levels, for example, L3 cache, L4 cache, and main memory.

Storage device 108 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 108 could be part of one virtual address space spanning multiple primary and secondary storage devices.

IO interface 106 may provide an interface between the processors 110 and an input/output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 104 may be configured to receive graphics data, for example, 2-Dimensional and 3-Dimensional graphics data, from a processor 110. GPU 104 may perform one or more computations to manipulate the graphics data, and render images on a display screen.

Processor 110 may include a plurality of processor cores 114. Processor cores 114 may be configured to perform pipelined execution of instructions retrieved from memory 112. Each processor core 114 may have an associated L1 cache 116. Each L1 cache 116 may be a relatively small memory cache located closest to an associated processor core 114 and may be configured to give the associated processor 114 fast access to instructions and data (collectively referred to henceforth as data).

Processor 110 may also include at least one L2 cache 118. An L2 cache 118 may be relatively larger than a L1 cache 116. Each L2 cache 118 may be associated with one or more L1 caches, and may be configured to provide data to the associated one or more L1 caches. For example a processor core 114 may request data that is not contained in its associated L1 cache. Consequently, data requested by the processor core 114 may be retrieved from an L2 cache 118 and stored in the L1 cache 116 associated with the respective processor core 114.

In one embodiment of the invention, L1 cache 116, and L2 cache 118 may be SRAM based devices. However, one skilled in the art will recognize that L1 cache 116 and L2 cache 118 may be any other type of memory, for example, DRAM. One skilled in the art will also recognize that one or more higher levels of cache, for example, L3 cache and L4 cache may also be included in system 100. Each higher level cache may be associated with one or more caches of the next lower level.

Figure 2:
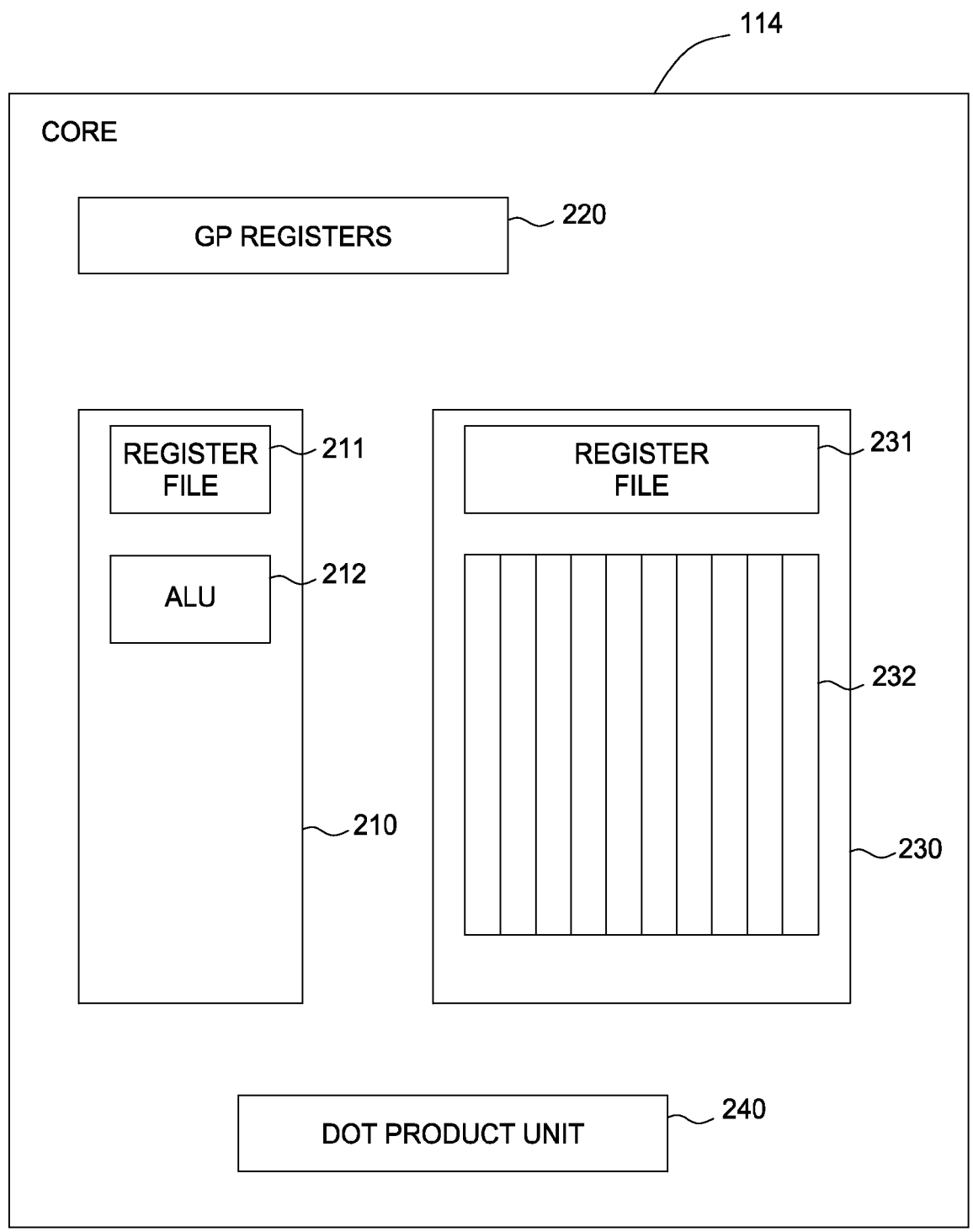
FIG. 2 illustrates an exemplary processor core according to an embodiment of the invention.

FIG. 2 is a more detailed diagram of components of a processor core 114 according to an embodiment of the invention. Processor core 114 may include a set of general purpose (GP) registers 220 for storing data. Processor core 114 may also include one or more processing subunits for performing one or more operations on data in response to receiving an instruction. For example, processor core 114 may include one or more scalar units 210, one or more vector units 230, and/or one or more dot product units 240.

Scalar unit 210 may comprise a register file 211 and an arithmetic and logic unit (ALU) 212. Register file 211 may contain data and addresses that may be manipulated by the scalar unit 210. In one embodiment of the invention, ALU 212 may be configured to operate on a pair of operands to produce a result. Scalar operations may include, for example, arithmetic operations such as addition and subtraction. The result produced by a scalar unit 210 may be stored in the register file 211, register file 231, and/or general purpose registers 230. In one embodiment of the invention, scalar unit 210 may be configured to perform pipelined execution of scalar instructions.

The vector unit 230 may include a set of registers 231, and a set of parallel pipelines 232 for operating on data in registers 231. Pipelines 232 may include one or more arithmetic pipelines configured to perform arithmetic operations, for example, floating point calculations and fixed point calculations. Pipelines 232 may also contain one or more load/store pipelines for transferring data between GP registers 220 or registers 231 on the one hand and some form of memory (generally L1 Cache or L2 Cache) on the other. Additional pipelines, such as an instruction fetch and decode pipeline, may also exist within processor core 114. In addition to components shown in FIG. 2, processor core 114 may include additional special purpose registers and counters, load and store hardware for fetching data from or storing it to cache or memory, control hardware, and so forth.

The dot product unit 240 may be configured to perform one or more operations associated with computing a dot product of two vectors. A dot product operation produces a scalar value that is independent of the coordinate system and represents an inner product of the Euclidean space. The equation below describes a dot product operation performed between the previously described vectors A and B, wherein vector A may be represented by coordinates $[x_a, y_a, z_a]$, and vector B may be represented by coordinates $[x_b, y_b, z_b]$:

$$A \cdot B = x_a \cdot x_b + y_a \cdot y_b + z_a \cdot z_b$$

In one embodiment of the invention, the each of the products $x_a^*x_b$, $y_a^*y_b$, and $z_a^*z_b$ may be computed in the parallel pipelines of the vector unit. The dot product unit may compute the sum of the products $X_a^*x_b$, $y_a^*y_b$, and $z_a^*z_b$ to generate the dot product.

While the scalar unit 210 and vector unit 230 are shown as separate and independent units in FIG. 2, in some embodiments of the invention, the vector and scalar units may be integrated into a single unit. For example, in one embodiment, a predetermined processing lane of the vector unit may be dedicated to execute scalar instructions. An integrated register file may be provided with an integrated vector/scalar unit to store vector and scalar operands. By integrating the vector/scalar unit and an integrated register file, high latency memory accesses for exchanging data between register files in separate vector and scalar units may be avoided.

During execution of instructions a combined vector/scalar unit may process both vector and scalar instructions. While executing a scalar instruction, one or more scalar operands may be manipulated in the predetermined scalar processing lane of the vector/scalar unit. On the other hand, while processing vector instructions, a plurality of vector and/or scalar operands may be manipulated in one or more of a plurality of processing lanes of the vector/scalar unit.

Scalar units, vector units, and vector/scalar units generally operate on two operands at a time while performing a scalar operation. For example, to determine the largest of three numbers (X1, X2, and X3), two compare instructions may be issued, wherein each compare instruction compares a pair of operands. In one embodiment, a first compare instruction may compare X1 and X2 to determine a greater of the two numbers. A second compare instruction may compare the greater of X1 and X2 to X3, thereby determining the greatest of the three numbers.

Executing a compare instruction may involve subtracting a first operand from a second operand. Based on the sign of the result, i.e. negative or positive, the greater of the two numbers may be determined. For example, comparing X1 and X2 may involve subtracting X2 from X1. If the sign of the result is positive, then X1 may be determined to be the greater number. However, if the sign is negative, then X2 may be determined to be the greater number. In one embodiment of the invention, an absolute value of the first operand may be subtracted from an absolute value of the second operand while executing a compare instruction.

Determining the smallest of three numbers may also involve issuing two compare instructions. For example, a first compare instruction may compare X1 and X2 to determine the smaller of the two numbers. A second compare instruction may compare the smaller of X1 and X2 to X3, thereby determining the smallest of the three numbers.

Comparing two numbers to determine the smaller number may also involve subtracting a first operand from a second operand. Based on the sign of the result, i.e. negative or positive, the smaller of the two numbers may be determined. For example, comparing X1 and X2 may involve subtracting X2 from X1. If the sign of the result is positive, then X2 may be determined to be the smaller number. However, if the sign is negative, then X1 may be determined to be the smaller number.

Determining the greatest or smallest of a plurality of numbers by issuing multiple two-operand add instructions can result in stall cycles in a processor computing the greatest or smallest of multiple numbers because of dependencies between subsequent instructions. For example, in the above examples for determining the greater and smaller of three numbers, the second compare instruction depends on the result of the first compare instruction. Furthermore, the results of the first compare instruction may be stored in a temporary register to make the result available to the second compare instruction, thereby potentially making a valuable temporary register unavailable for other purposes.

Embodiments of the invention provide multiple operand scalar instructions capable of determining the greatest or the smallest of more than two numbers by using unused vector processing lanes and the dot product unit during execution of the scalar instructions. At least one pair of the more than two numbers is transferred to one of plurality of processing lanes of the vector unit. In some embodiments, a plurality of pairs of operands is transferred to respective plurality of processing lanes. Each processing lane of the vector unit may compare the pair of operands and determine a greater (or smaller) operand. The results from each processing lane indicating the greater (or smaller) of a respective pair of operands may be forwarded to a dot product unit. The dot product unit may compare the greater (or smaller) operands from each vector processing lane and determine the greatest (or smallest) of the more than two numbers.

In some cases, where an odd number of operands is to be compared, at least one of the more than two operands may be transferred to a respective processing lane of the vector unit. The vector processing lane receiving the at least one operand may transfer the at least one operand to the dot product unit, wherein the at least one operand may be compared with results generated from one or more other vector processing lanes.

While various components of processor core 114 have been described and shown at a high level, it should be understood that the processor of the preferred embodiment contains many other components not shown, which are not essential to an understanding of the present invention. Furthermore, it will be understood that the processor core of FIG. 2 is simply one example of a processor architecture, and that many variations could exist in the number, type and arrangement of components within processor core 114, that components not shown may exist in addition to those depicted, and that not all components depicted might be present in a processor design. For example, the number and function of execution unit pipelines may vary; registers may be configured in different arrays and sets; dedicated floating point hardware may or may not be present; etc. Moreover, in some embodiments, the GPU 104 may contain one or features similar to those of the processor 110 such as, for example, a processor core comprising vector, scalar, and/or combined vector scalar units, and the like.

Figure 3:
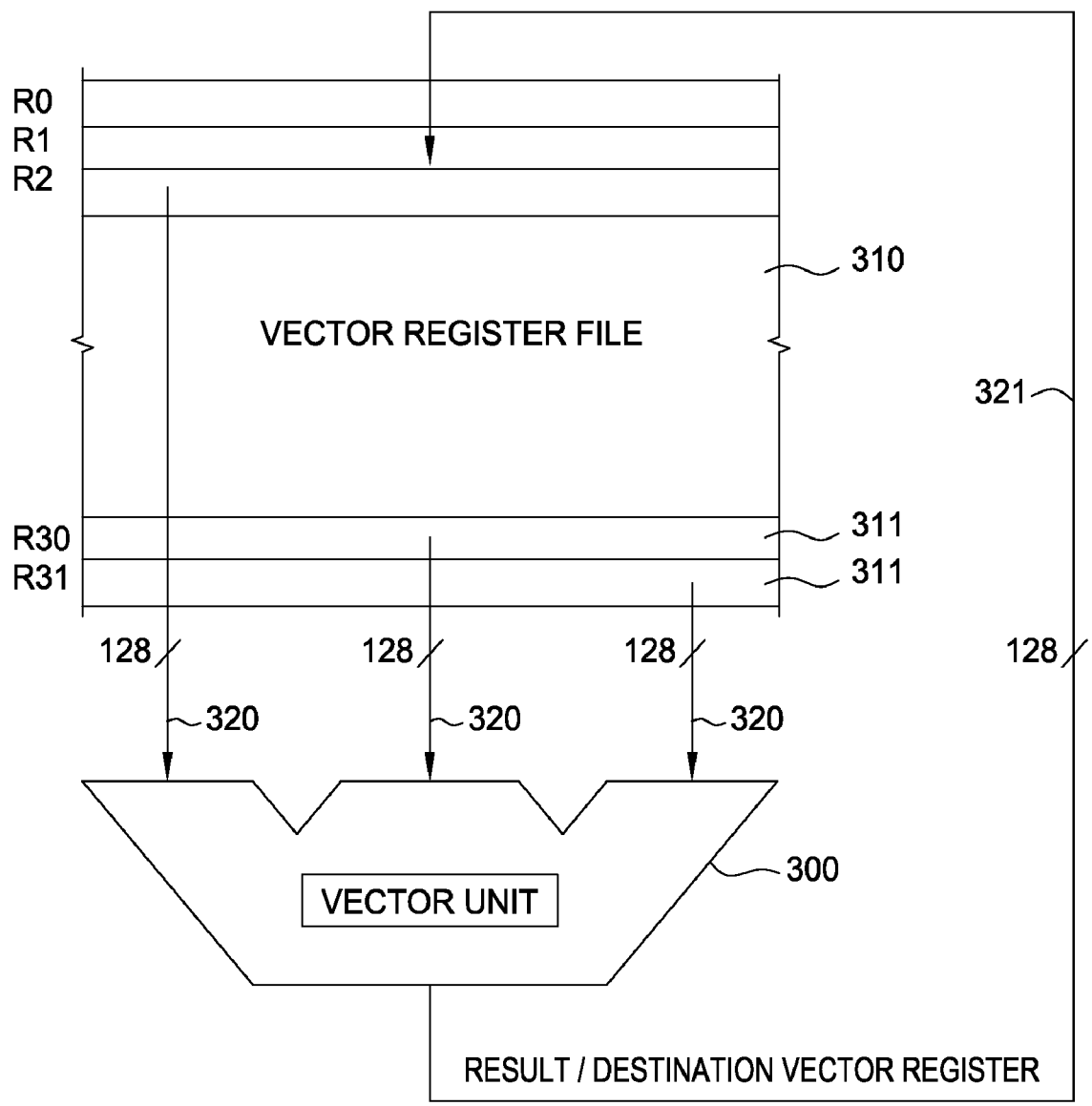
FIG. 3 illustrates an exemplary vector unit according to an embodiment of the invention.

FIG. 3 illustrates a more detailed view of an exemplary vector/scalar unit (hereinafter referred to simply as vector unit) 300 and an associated register file 310. Vector unit 300 may be configured to execute single instruction multiple data (SIMD) instructions. In other words, vector unit 300 may operate on one or more operands to produce a single scalar or vector result while processing vector or scalar instructions. For example, vector unit 300 may perform parallel operations on data elements that comprise one or more vectors or scalars to produce a scalar or vector result.

A plurality of operands operated on by the vector unit may be stored in register file 310. For example, in FIG. 3, register file 310 provides 32 128-bit registers 311 (R0-R31). In one embodiment, registers 311 may include vector data, for example, vector coordinates, pixel data, transparency, and the like. However, registers 311 may also be configured to store scalar data. Data may be exchanged between register file 310 and memory, for example, cache memory, using load and store instructions. Accordingly, register file 310 may be communicably coupled with a memory device, for example, a Dynamic Random Access memory (DRAM) device and or a cache (SRAM) device.

A plurality of busses 320 may connect register file 310 to vector unit 300. Each bus 320 may be configured to provide input from a register file to the vector unit. For example, in FIG. 3, three 128 bit busses connect the register file to the vector unit 700. In this manner, the contents of any 3 registers from register file 310 may be provided to the vector unit at a time.

The results of an operation performed by the vector unit 300 may be written back to register file 310. For example, a 128 bit bus 321 provides a write back path to write results computed by vector unit 300 back to any one of the registers 311 of register file 310.

Figure 4:
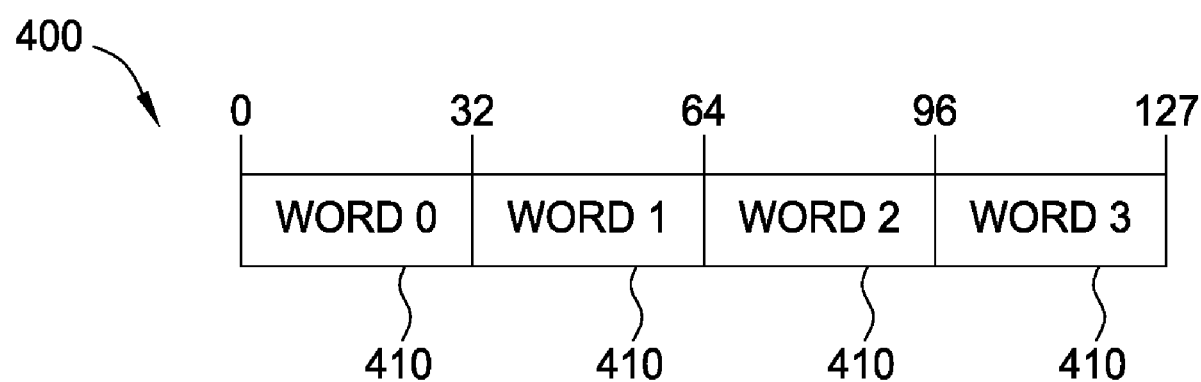
FIG. 4 illustrates an exemplary register according to an embodiment of the invention.

Each of registers 311 may be configured to store a plurality of operands. FIG. 4 illustrates the structure of an exemplary register 400 comprising one or more operands. Register 400 may correspond to a register 311 illustrated in FIG. 3. As illustrated in FIG. 4, register 400 comprises a plurality of sections 410, wherein each section comprises a vector or scalar operand.

In one embodiment, register 400 may be a 128 bit register. Register 400 may be divided into four 32 bit word sections: WORD 0, WORD 1, WORD 2, and WORD 3, as illustrated. WORD 0 may include bits 0-31, WORD 1 may include bits 32-63, WORD 2 may include bits 64-95, and WORD 3 may include bits 96-127, as illustrated. However, one skilled in the art will recognize that register 400 may be of any reasonable length and may include any number of sections of any reasonable length.

Figure 5:
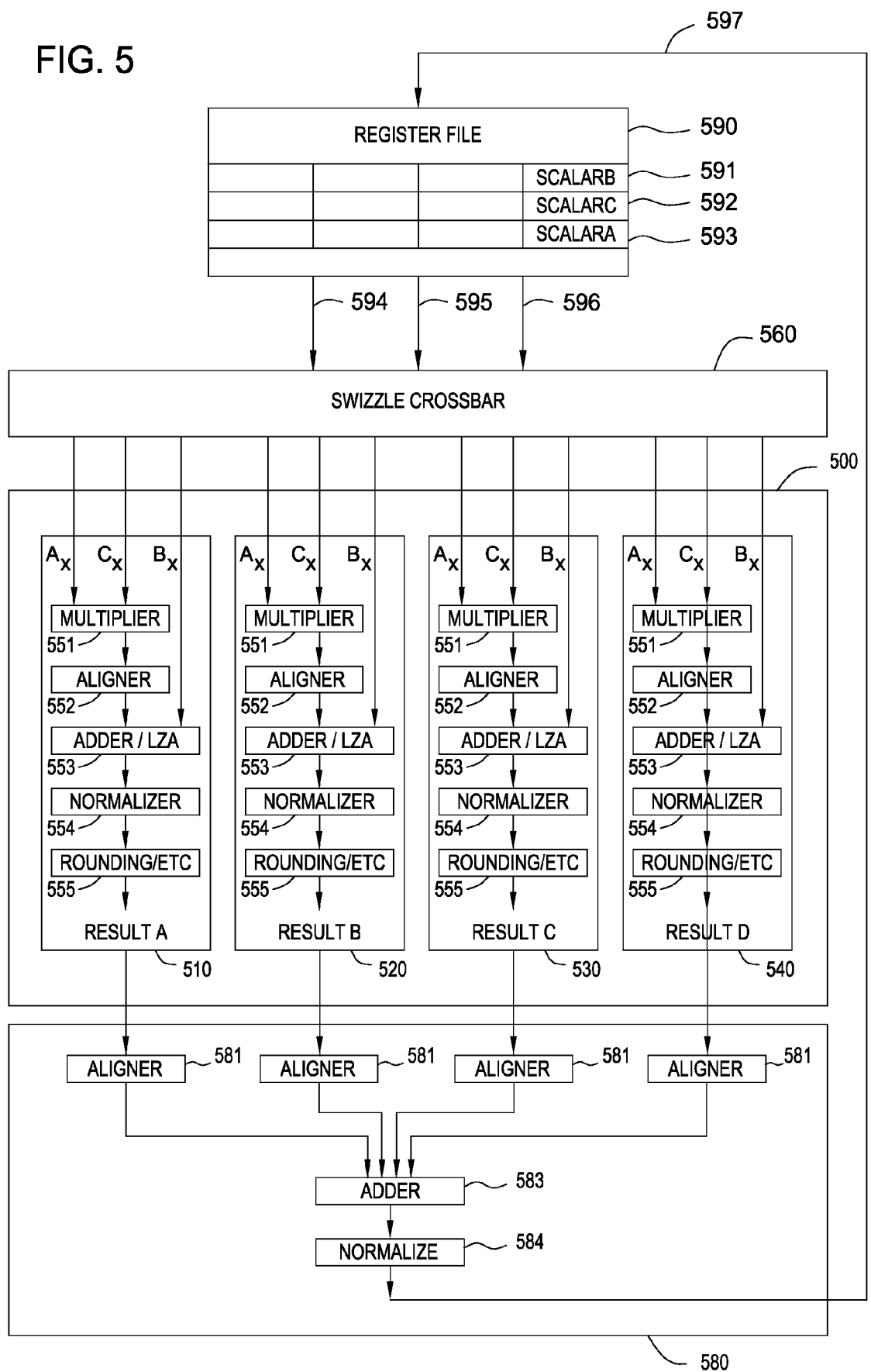
FIG. 5 illustrates another exemplary system according to an embodiment of the invention.

FIG. 5 illustrates an exemplary system according to an embodiment of the invention. Specifically, FIG. 5 illustrates a register file 590, a swizzle crossbar 560, and a more detailed view of components of a vector unit 500 and a dot product unit 580. Vector unit 500 is an embodiment of the vector unit 300 depicted in FIG. 3. As illustrated in FIG. 5, vector unit 500 may include a plurality of processing lanes. For example, four processing lanes 510, 520, 530 and 540 are shown in FIG. 5. Each processing lane may be configured to perform an operation in parallel with one or more other processing lanes. For example, each processing lane may add a pair of operands. By adding different pairs of operands in different processing lanes of the vector unit, addition of more than two operands may be performed faster and more efficiently.

Each processing lane may be pipelined to improve performance. Accordingly, each processing lane may include a plurality of pipeline stages, with each stage performing one or more operations on the operands. For example, each vector lane may include a multiplier 551 for multiplying a pair of operands $A_x$ and $C_x$. Operands $A_x$ and $C_x$ may be derived from one of the lanes coupling the register file with the vector unit, for example, lanes 320 in FIG. 3. In one embodiment of the invention, the multiplication of operands may be performed in a first stage of the pipeline.

Each processing lane may also include an aligner 552 for aligning the product computed by multiplier 551. For example, an aligner 552 may be provided in each processing lane. Aligner 552 may be configured to adjust a decimal point of the product computed by a multiplier 551 to a desirable location in the result. For example, aligner 552 may be configured to shift the bits of the product computed by multiplier 551 by one or more locations, thereby putting the product in desired format. While alignment is shown as a separate pipeline stage in FIG. 5, one skilled in the art will recognize that the multiplication and alignment may be performed in the same pipeline stage.

Each processing lane may also include an adder 553 for adding, subtracting, and/or comparing two operands. In one embodiment (illustrated in FIG. 5), each adder 553 may be configured to receive the product computed by a multiplier, and add, subtract or compare the product to another operand $B_x$. Operand $B_x$, like operands $A_x$ and $C_x$, may be derived from one of the lanes connecting the register file to the vector unit. In some embodiments, one of the operands $A_x$ and $C_x$ may be directly provided to the adder 553. Therefore, each adder 553 may be configured to compute a sum or difference of two operands received from the register file. Therefore, a plurality of add, subtract, and compare operations may be performed simultaneously in parallel in each of the processing lanes.

Each vector processing lane may also include a normalizing stage and a rounding stage, as illustrated in FIG. 5. Accordingly, a normalizer 554 may be provided in each processing lane. Normalizer 554 may be configured to represent a computed value in a convenient exponential format. For example, normalizer may receive the value 0.0000063 as a result of an operation. Normalizer 554 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder may round the least significant bits of the particular precision floating point number the rounder is designed to work with.

One skilled in the art will recognize that embodiments of the invention are not limited to the particular pipeline stages, components, and arrangement of components described above and in FIG. 5. For example, in some embodiments, aligner 552 may be configured to align operand $B_x$, a product computed by the multiplier, or both. Furthermore, embodiments of the invention are not limited to the particular components described in FIG. 5. Any combination of the illustrated components and additional components such as, but not limited to, leading zero adders, dividers, etc. may be included in each processing lane.

In one embodiment of the invention, vector unit 500 may be configured to execute both vector and scalar instructions. For example, in a particular embodiment, vector unit 500 may include four processing lanes, wherein three processing lanes are used to perform vector operations and one processing lane is configured to perform scalar operations. For example lanes 510-530 may be used to execute vector instructions and lane 540 may be used to execute scalar instructions. In some embodiments, each vector processing lane may be configured to perform both, vector and scalar operations.

Dot product unit 580 may correspond to the dot product unit 240 illustrated in FIG. 2. As illustrated in FIG. 5, dot product unit 580 may include a plurality of aligners 581. Each aligner 581 may receive, as an input, the output of an associated vector unit processing lane, as illustrated in FIG. 5. Aligner 581 may be similar to the aligner 552 and may be configured to shift the bits of an input by one or more locations, thereby putting the input in desired format.

The aligned and compressed inputs from the vector unit may be added, subtracted or compared by an adder 583 of the dot product unit 580. Adder 583 may be similar to the adder 553 and may compute a sum or difference of the inputs received from the compressor 582. In one embodiment of the invention, adder 583 may include a compressor, for example a 4:2 compressor. A 4:2 compressor may receive 4 input operands, and outputs 2 operands (sum/carry). Therefore, a full add of only two operands is necessary.

The result computed by the adder 583 may be normalized by a normalizer 584. Normalizer 584 may be similar to normalizer 554 and configured to represent a value computed by the adder 583 in a convenient exponential format. Therefore, embodiments of the invention permit the calculation of a result of more than two operands with a single instruction.

FIG. 5 also illustrates a register file 590. Register file 590 may correspond to the register file 310 illustrated in FIG. 3. Each register in register file 310 may be similar to register 400 illustrated in FIG. 4 and may comprise a plurality of operands. For example, three registers 591-593 are illustrated. Register 591 may include an operand ScalarB, register 592 may include an operand ScalarC, and register 593 may include an operand ScalarA, as illustrated.

The lanes 594-596 coupling the register file 590 to the swizzle crossbar 560 may correspond to the lanes 320 illustrated in FIG. 3. Accordingly, each of the lanes 594-596 may transfer operands from a register of register file 590 to the swizzle crossbar 560. For example, in one embodiment, in response to receiving a multiple operand instruction for adding operands scalarA, scalarB, and scalarC, the contents of registers 591, 592, and 593 may be transferred to the swizzle crossbar.

Swizzle crossbar 560 may be configured to determine an order in which operands from one or more registers of a register file are provided to the vector unit 500. For example, the swizzle crossbar 560 may contain a plurality of operand multiplexors, wherein each operand multiplexor is associated with one of the operands $A_x$, $B_x$, and $C_x$ of vector processing lanes 510-540. Each of the plurality of operand multiplexers may receive a plurality of operands from the register file and select one of the operands.

For example, during execution of the multiple operand instruction for determining the greatest (or smallest) of more than two operands, the swizzle crossbar 560 may be configured to transfer a pair of operands to one or more vector processing lanes. For example, while processing a multiple operand instruction for determining the greatest (or smallest) of operands scalarA, scalarB, and scalarC, the swizzle crossbar 560 may be configured to transfer a pair of operands, for example, scalarA and scalarB to a respective vector processing lane, for example, lane 510.

Vector processing lane 510 may be configured to determine a greater (or smaller) of the operands scalarA and scalarB. For example, in one embodiment, adder 553 of vector processing lane 510 may subtract scalarB from scalarA, to determine the greater (or smaller) of scalarA and scalarB. To perform a subtraction, the sign bits of one or more operands may be flipped. For example, in a particular embodiment, the two's complement of operands to be subtracted (scalarB in this example) may be derived and sent to adder 553 to perform a subtraction. Because the operands to be subtracted are represented in two's complement form, adder 553 may simply add the operands including operands in two's complement form to obtain a result comprising addition and subtraction of operands. The greater (or smaller) of scalarA and scalarB may be determined based on a sign of the result produced by the adder 553.

Furthermore, if the greatest or smallest of an odd number of operands is to be determined, the swizzle crossbar 560 may be configured to transfer at least one operand to a respective processing lane. For example, while processing a multiple operand instruction for determining the greatest (or smallest) of operands scalarA, scalarB, and scalarC, the swizzle crossbar 560 may be configured to transfer operand scalarC to a respective vector processing lane, for example, vector processing lane 520 of vector unit 500. Vector processing lanes 520 may be configured to allow operand scalarC to pass through to the dot product unit 580.

In some embodiments, the swizzle crossbar 560 may be configured to transfer one or more predetermined values to a vector processing lane in addition to an operand of the multiple operand instruction. For example, in one embodiment, operand scalarC may be transferred to the $A_x$ input of multiplier 551 in vector processing lane 520. In one embodiment, swizzle crossbar 560 may transfer a value of '1' to the Cx input of multiplier 551 and a value of '0' to the $B_x$ input of adder 553 in vector processing lane 510. Therefore, multiplier 551 may multiply the operand scalarC by '1' and adder 553 may add '0' to operand scalarC, thereby preserving the value of scalarC.

In alternative embodiments, swizzle crossbar 560 may transfer a value of '0' to the Ax and/or Cx inputs of multiplier 551, and operand scalarC to the Bx input of adder 553 in vector processing lane 510. Therefore, multiplier 551 may produce a product of '0' and adder 553 may add '0' to operand scalarC, thereby preserving the value of scalarC.

The greater (or smaller) of scalarA and scalarB determined in vector processing lane 510 and scalarC from vector processing lane 520 may be provided to the inputs of a respective aligner 581 of dot product unit 580. Aligners 581 may align the respective operands and transfer the operands to Adder 583. Adder 583 of the dot product unit 580 may determine the greatest (or smallest) of the operands scalarA, scalarB, and scalarC by comparing the greater (or smaller) of scalarA and scalarB with scalarC. The result of the comparison may be normalized by the normalizer 584 and written back to a register in the register file 590 via a write back lane 597. In one embodiment of the invention, one or more masking bits may be used to specify a particular location (or locations) within a register in which the sum is written.

FIG. 6A illustrates a timing diagram for determining the greatest (or smallest) of three operands using two operand scalar floating point instructions. Determining the greatest (or smallest) number may involve executing a first compare instruction 601 configured to compare a first pair of operands X1 and X2. For example, the first compare instruction may involve subtracting the operands X1 and X2. As illustrated in FIG. 6A, in one embodiment, executing the first compare instruction may take four clock cycles (cycles 1-4 in FIG. 6A).

Determining the greatest (or smallest) of three operands may further involve executing a second compare instruction configured to compare the greater (or smaller) of X1 and X2 with a third operand X3. Because the second compare instruction depends on the results of the first compare instruction, execution of the second compare instruction may not begin until execution of the first compare instruction is complete, i.e. in cycle 5, as illustrated in FIG. 6A. In one embodiment of the invention, executing the second compare instruction may also take four clock cycles (cycles 5-8). Accordingly, determining the greatest (or smallest) of three operands may take a total of eight clock cycles.

FIG. 6B illustrates a timing diagram for determining the greatest (or smallest) of three operands using a multiple operand instruction. Because the multiple operand instruction can compare more than two operands, the arithmetic operation may be performed by issuing a single instruction 603. In one embodiment of the invention, executing instruction 603 may take six clock cycles to allow the operands to pass through the vector processing lanes and the comparison to be performed in the dot product unit. As can be seen by comparing FIGS. 6A and 6B, the multiple operand instruction determining the greatest (or smallest) of three operands faster, thereby improving efficiency. Furthermore, the use of temporary registers to store intermediate results in avoided.

While determining the greatest (or smallest) of three operands is disclosed herein, embodiments of the invention may determine the greatest (or smallest) of any number of operands using a multiple operand instruction. In one embodiment, the number of operands compared may be based on the number of vector processing lanes available. Furthermore, the dot product unit may include any number of aligners, adders, compressors, and the like to facilitate comparison of operands received from a plurality of vector processing lanes.

By providing a single instruction for determining the maximum (or minimum) of more than two operands, embodiments of the invention reduce the number of temporary registers and stall cycles, thereby improving performance and allowing for efficient use of system resources.

While the foregoing is directed to embodiments of the present invention, other and further embodiments of the invention may be devised without departing from the basic scope thereof, and the scope thereof is determined by the claims that follow.

What is claimed is:

1. A method comprising:
    in response to receiving a multiple operand instruction, transferring more than two operands comprising at least a first operand, a second operand, and a third operand from a register file to a swizzle crossbar;
    transferring the more than two operands from the swizzle crossbar to one or more processing lanes of a vector unit according to an order determined by the swizzle crossbar, wherein each of the one or more processing lanes of the vector unit is configured to perform arithmetic operations including at least one of floating point calculations and fixed point calculations;
    comparing the first operand to the second operand in a first processing lane among the one or more processing lanes of the vector unit, wherein the first operand is passed to a multiplier of the first processing lane, and wherein the second operand is passed to an adder of the first processing lane;
    based on the comparison, transferring one of the first operand and the second operand from the first processing lane to a dot product unit, wherein the dot product unit is configured to perform all operations associated with computing a dot product of two vectors;
    passing the third operand through the vector unit to the dot product unit, wherein the third operand is passed to a multiplier of a second processing lane among the one or more processing lanes of the vector unit; and
    comparing one of the first operand and the second operand to the third operand in the dot product unit.

2. The method of claim 1, wherein the more than two operands are received from one or more registers in the register file, each of the one or more registers in the register file comprising a plurality of operands.

3. The method of claim 1, wherein the swizzle crossbar is configured to transfer pairs of operands to respective processing lanes among the one or more processing lanes of the vector unit.

4. The method of claim 1, wherein the second processing lane is configured to transfer the third operand to the dot product unit.

5. The method of claim 1, wherein comparing the first operand and the second operand comprises determining one of a greater and a smaller of the first operand and the second operand.

6. The method of claim 1, wherein comparing one of the first operand and the second operand to the third operand comprises determining one of a greater and a smaller of the more than two operands.

7. The method of claim 1, wherein each of the one or more processing lanes of the vector unit comprises an adder, a multiplier, an aligner, and a normalizer.

8. The method of claim 1, wherein comparing the first operand and the second operand comprises subtracting the first operand from the second operand.

9. The method of claim 1, wherein the dot product unit comprises at least two aligners, at least one adder, and a normalizer, wherein an output of each aligner is passed to the at least one adder, and wherein an output of the at least one adder is passed to the normalizer.

10. A method comprising:
    in response to receiving a three operand instruction, transferring a first operand, a second operand, and a third operand from a register file to a swizzle crossbar;
    transferring the first operand and the second operand from the swizzle crossbar to a first processing lane of a vector unit and the third operand from the swizzle crossbar to a second processing lane of the vector unit according to an order determined by the swizzle crossbar, wherein each of the first processing lane and the second processing lane is configured to perform arithmetic operations including at least one of floating point calculations and fixed point calculations;
    comparing the first operand to the second operand in the first processing lane, wherein the first operand is passed to a multiplier of the first processing lane, and wherein the second operand is passed to an adder of the first processing lane;
    transferring one of a greater and smaller of the first operand and the second operand from the first processing lane to a dot product unit, wherein the dot product unit is configured to perform all operations associated with computing a dot product of two vectors;
    transferring the third operand from the second processing lane to the dot product unit, wherein the third operand is passed to a multiplier of the second processing lane; and
    comparing one of the first operand and the second operand to the third operand in the dot product unit to determine one of a greater and smaller of the first operand, the second operand, and the third operand.

11. The method of claim 10, wherein the three operands are received from one or more registers in the register file, each of the one or more registers in the register file comprising a plurality of operands.

12. The method of claim 10, wherein each of the first processing lane and the second processing lane comprises an adder, a multiplier, an aligner, and a normalizer.

13. The method of claim 12, wherein the adder is configured to determine a difference between the first operand and the second operand.

14. The method of claim 10, wherein the dot product unit comprises at least two aligners, at least one adder, and a normalizer, wherein an output of each aligner is passed to the at least one adder, and wherein an output of the at least one adder is passed to the normalizer.

15. A system comprising a plurality of processors communicably coupled with one another, wherein each processor comprises:
    a register file comprising a plurality of registers, each of the plurality of registers comprising a plurality of operands;
    a vector unit comprising a plurality of processing lanes configured to receive more than two operands among the plurality of operands, wherein a first processing lane among the plurality of processing lanes is configured to compare a first operand and a second operand to determine one of a greater and smaller of the first operand and second operand, wherein the first operand is passed to a multiplier of the first processing lane, wherein the second operand is passed to an adder of the first processing lane, wherein a second processing lane among the plurality of processing lanes is configured to pass a third operand through the vector unit, wherein the third operand is passed to a multiplier of the second processing lane, and wherein each of the plurality of processing lanes is configured to perform arithmetic operations including at least one of floating point calculations and fixed point calculations;

a swizzle crossbar configured to determine an order in which the more than two operands are provided to the vector unit; and a dot product unit for performing all operations associated with computing a dot product of two vectors, wherein the dot product unit is configured to:
  receive one of the first operand and the second operand from the first processing lane of the vector unit,
  receive the third operand from the second processing lane of the vector unit, and
  compare the received one of the first operand and second operand to the third operand to determine one of a greater and smaller of the more than two operands.

16. The system of claim 15, wherein the swizzle crossbar is further configured to transfer pairs of operands to respective processing lanes of the vector unit.

17. The system of claim 15, wherein the second processing lane of the vector unit is configured to transfer the third operand to the dot product unit.

18. The system of claim 15, wherein each of the plurality of processing lanes of the vector unit comprises an adder, a multiplier, an aligner, and a normalizer.

19. The system of claim 15, wherein the dot product unit comprises at least two aligners, an adder, and a normalizer, wherein an output of each aligner is passed to the adder, and wherein an output of the adder is passed to the normalizer.

20. The system of claim 15, wherein comparing the first operand and the second operand comprises determining one of a greater and a smaller of the first operand and the second operand.

21. The system of claim 15, wherein comparing one of the first operand and the second operand to the third operand comprises determining one of a greater and a smaller of the more than two operands.

* * * * *